United States Patent
Harper (10) Patent No.: US 7,839,598 B2
(45) Date of Patent: Nov. 23, 2010

(54) BALANCED LINKAGE ACTUATION OF TAPE HEAD

(75) Inventor: David Howard Flores Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/028,690

(22) Filed: Feb. 8, 2008

(65) Prior Publication Data
US 2009/0201604 A1    Aug. 13, 2009

(51) Int. Cl.
*G11B 5/584* (2006.01)
(52) U.S. Cl. .................................... 360/77.12
(58) Field of Classification Search .............. 360/77.12, 360/69, 78.05, 76, 85, 134, 137, 291
See application file for complete search history.

(56) References Cited

U.S. PATENT DOCUMENTS

| | | | |
|---|---|---|---|
| 3,037,290 A | | 6/1962 | Dolby |
| 3,596,153 A | * | 7/1971 | Brainard et al. ............. 318/574 |
| 4,101,938 A | * | 7/1978 | Hanai ........................... 360/16 |
| 4,121,520 A | * | 10/1978 | Shenoha ..................... 101/316 |
| 4,262,316 A | * | 4/1981 | Hartmann et al. ........ 360/98.02 |
| 4,310,863 A | | 1/1982 | Lelandais |
| 4,427,166 A | | 1/1984 | Oishi et al. |
| 4,458,854 A | | 7/1984 | Richard |
| 4,466,582 A | | 8/1984 | Shiba |
| 4,509,031 A | | 4/1985 | Sakata et al. |
| 4,541,557 A | | 9/1985 | Fell et al. |
| 4,633,347 A | | 12/1986 | Higgins |
| 4,642,707 A | * | 2/1987 | Geiger et al. ................. 360/76 |
| 4,677,508 A | * | 6/1987 | Barton et al. ............ 360/96.51 |
| 5,005,089 A | | 4/1991 | Thanos et al. |
| 5,172,282 A | | 12/1992 | Ghose |
| 5,198,947 A | * | 3/1993 | Nayak et al. ................. 360/291 |
| 5,311,390 A | * | 5/1994 | Nayak et al. ................. 360/137 |
| 5,434,732 A | | 7/1995 | Schwarz et al. |
| 5,447,279 A | | 9/1995 | Janssen et al. |

(Continued)

FOREIGN PATENT DOCUMENTS

JP    63222361 A2    9/1988

OTHER PUBLICATIONS

U.S. patent application entitled "Magnetically Biased Tilting Roller Bearing Tape Guidance", serial No. unknown, filed Jan. 29, 2008, IBM, by inventors A.J. Argumedo, N.X. Bui, W. M. Dyer, R.A. Hancock, D.H. Harper, W.I. Imaino and K.B. Judd.

(Continued)

*Primary Examiner*—Fred Tzeng
(74) *Attorney, Agent, or Firm*—William K. Konrad; Konrad Raynes & Victor LLP (57) ABSTRACT

In one embodiment, first and second levers of a tape head actuator are balanced using first and second masses carried on first and second sides, respectively, of the first and second levers. The first and second levers are linked with a link member of the first mass which further includes a tape read/write head supported by the link member. In the illustrated embodiment, the levers are linked by the pivotally connected link members to form a four member linkage. The tape read/write head may be carried by the link member. Other embodiments are described and claimed.

24 Claims, 6 Drawing Sheets

U.S. PATENT DOCUMENTS

| | | | |
|---|---|---|---|
| 5,450,257 A * | 9/1995 | Tran et al. ............... | 360/76 |
| 5,507,424 A | 4/1996 | Kitajima et al. | |
| 5,585,978 A * | 12/1996 | Rottenburg et al. ......... | 360/85 |
| 5,625,515 A | 4/1997 | Brown | |
| 5,710,681 A * | 1/1998 | Eckberg et al. ......... | 360/261.1 |
| 5,726,834 A | 3/1998 | Eckberg et al. | |
| 5,729,890 A * | 3/1998 | Rottenburg et al. ...... | 29/603.18 |
| 5,731,935 A | 3/1998 | Lian et al. | |
| 5,788,137 A | 8/1998 | Ku | |
| 5,793,573 A | 8/1998 | Eckberg et al. | |
| 5,798,885 A | 8/1998 | Saiki et al. | |
| 5,857,261 A * | 1/1999 | Li ........................ | 33/767 |
| 5,949,619 A | 9/1999 | Eckberg et al. | |
| 6,137,659 A | 10/2000 | Warmenhoven | |
| 6,208,497 B1 | 3/2001 | Seale et al. | |
| 6,467,669 B1 | 10/2002 | Okada | |
| 6,754,033 B1 | 6/2004 | Argumedo et al. | |
| 6,762,665 B1 | 7/2004 | Iwai et al. | |
| 6,963,467 B2 | 11/2005 | Bui et al. | |
| 7,054,101 B1 | 5/2006 | Marion et al. | |
| 2003/0016467 A1 | 1/2003 | Bui et al. | |
| 2005/0201017 A1 | 9/2005 | Koga et al. | |

OTHER PUBLICATIONS

U.S. patent application entitled "Friction Engaged Tilting Roller Bearing Tape Guidance", serial No. unknown, filed Jan. 29, 2008, IBM, by inventors A.J. Argumedo, W. M. Dyer, W.I. Imaino and K.B. Judd.

U.S. patent application entitled "Moving Magnet Actuation of Tape Head", serial No. unknown, filed Jan. 29, 2008, IBM, by inventors N.X. Bui, R.A. Hancock, D.H. Harper, and W.I. Imaino.

U.S. patent application entitled "Magnetically Biased Tilting Roller Bearing Tape Guidance", serial No. unknown, filed Feb. 8, 2008, by inventors A.J. Argumedo, N. X. Bui, W. M. Dyer, R.A. Hancock, D.H. Harper, W.I. Imaino and K.B. Judd.

U.S. patent application entitled "Friction Engaged Tilting Roller Bearing Tape Guidance", serial No. unknown, filed Feb. 8, 2008, by inventors A.J. Argumedo, W. M. Dyer, W.I. Imaino and K.B. Judd.

U.S. patent application entitled "Moving Magnet of Tape Head", serial No. unknown, filed Be. 8, 2008, by inventors N. X. Bui, R.A. Hancock, D.H. Harper, and W.I. Imaino.

* cited by examiner

BALANCED LINKAGE ACTUATION OF TAPE HEAD

BACKGROUND

Data storage on magnetic tape is well known and tape recorders have been used to record data tracks on magnetic tape. Traditionally, data is recorded in a plurality of parallel data tracks on the magnetic tape. The read/write head is then positioned relative to the tape path by moving the head to different track positions as desired. In such a system, the tape tracks are generally sufficiently wide and separated to facilitate reliably reading and writing the data.

In one approach, the read/write head may be positioned at a predetermined fixed point, relative to the magnetic tape path, and the data tracks are intended to accommodate variations of recording track location and tape locations as the tape feeds past the head. Historically, this accommodation has been accomplished by providing sufficient track width and data track separation on the magnetic tape to permit the read/write head to remain positioned over the designated track and at the same time not read magnetically recorded signals from an adjacent track. This arrangement of track width and track separation is intended to accommodate deviation of the track location from the design norm either due to being recorded on a first recorder and played or rerecorded on a second recorder or due to the wander of the tape as it is spooled past the read/write head from one spool to the other spool of a cartridge.

However, the definition of the magnetic read/write head and the track widths and separations can limit the number of data tracks that may be recorded on any given width of tape. Reliance solely on the track width and track separations for reliable read/write operations can result in a significant waste of magnetic tape surface and thus limit the data density on the tape. However, as the track width and the read/write head width narrow in an effort to increase the data capacity of a given tape area, any misalignment of the head with the track may lead to read/write repeatability failures and lost data. Thus, the resolution of the head placement mechanism and the precision of the placement of the tape relative to the read/write head can be limiting factors affecting the recording density of data on the magnetic tape surface in tape drives having static read/write heads.

More recently, tape drive systems have used a track following servo system for moving the tape head in a lateral direction to follow lateral movement of the longitudinal tracks as the tape is moved in the longitudinal direction. The track following servo system may employ servo tracks on the tape which are parallel to the data tracks, and employ servo read heads to read the servo tracks to detect position error and thereby position the tape head at the data tracks and follow the data tracks. This allows the data tracks to be placed closely together and increase the number of data tracks.

The tape is typically contained in a cartridge of one or two reels, and the tape is moved between a supply reel and a take up reel. The reels typically have runout causing the tape to move laterally as the tape is moved longitudinally. Tape guides are often provided to limit the amplitude of the lateral movement of the tape so that it does not exceed the lateral movement capability of the track following servo system.

In high track density tape storage devices, a compound actuator may be used in a track following system. The compound actuator typically includes a coarse actuator which usually is a stepper motor, and a fine actuator which frequently has a linear high bandwidth, and a limited range of travel. Thus, a compound actuator can have both high bandwidth and a large working dynamic range.

In such a compound actuator system, a magnetic read head gap may be placed at a position relative to a servo track on the tape. Then the read head gap is further moved to detect the edge of the servo control track (servo track) recorded on the tape. The read head will provide signals which may be used to indicate the head location relative to the servo track. By using these signals as a basis, the servo control then may produce a positioning signal to drive a servo positioner. The servo positioner moves the read head, causing the read head to track or follow the edge of the servo control track which has been previously recorded on the tape.

The transient response of the tape head track following servo system typically comprises a high bandwidth for a very limited lateral movement, called "fine" track following, for allowing the tape head to accurately follow small displacements of the tape. Larger movement of the tape head is typically conducted as "coarse" track following, which is also employed to shift the tape head from one set of tracks to another set, and is typically conducted at a slow rate. However, it is appreciated that the occurrence of a lateral transient shift, can be so rapid that neither the fine track follower nor the coarse track follower is able to respond sufficiently. As a result, the tracking can become so large that writing may be stopped to prevent overwriting an adjacent track and to insure that the tracking error on read back is not so large as to cause a readback error.

Figure 10:
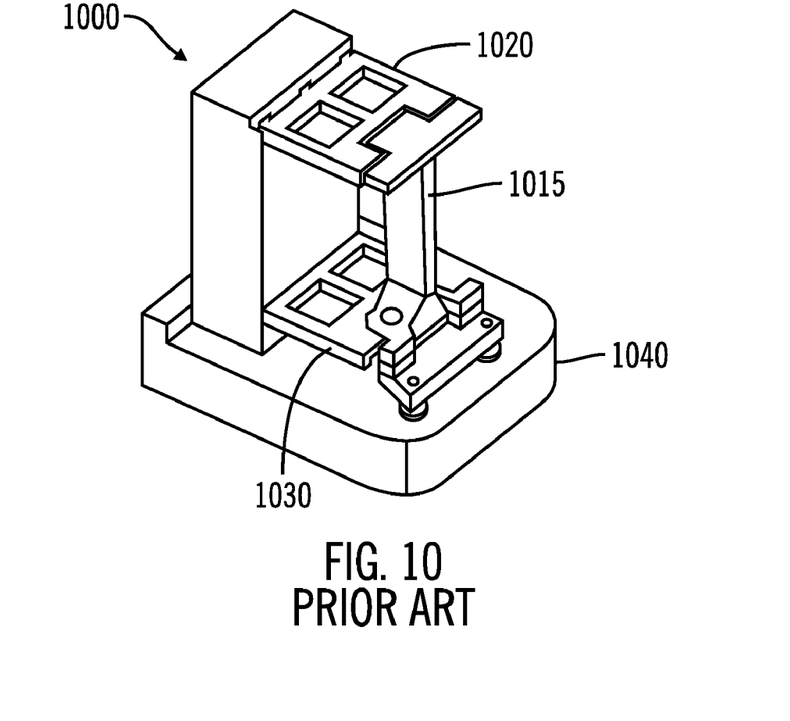
FIG. 10 is an isometric schematic view of a prior art fine actuator.

An example of a compound actuator is described in coassigned U.S. Pat. No. 5,793,573. FIG. 10 shows one example of an existing fine actuator 1000 having a tape head (not shown) suspended by a beam 1015 between dual flextures 1020, 1030. A voice coil motor (VCM) disposed in a base 1040 is coupled to the lower flexture 1030 and to the beam 1015 supporting the head between the flextures 1020, 1030. Current applied to the voice coil motor causes the motor to displace the lateral location of the head relative to the tape, depending upon the direction and magnitude of the applied current.

The flextures 1020, 1030 each have a spring constant which biases the beam 1015 and the head to a central neutral location in the absence of current applied to the voice coil motor. To counteract a natural resonance frequency of the spring constant exhibited by the flextures 1020, 1030, a damping mechanism such as a damping fluid may be provided in the base 1040.

SUMMARY OF THE DESCRIPTION

In one embodiment, first and second levers of a tape head actuator are balanced using first and second masses carried on first and second sides, respectively, of the first and second levers. The first and second levers are linked with a link member of the first mass which further includes a tape read/write head supported by the link member. In the illustrated embodiment, the levers are linked by the pivotally connected link members to form a four member linkage. The tape read/write head may be carried by the link member.

To move the tape head, a motor may be activated to pivot the first and second levers wherein the second balancing mass includes at least a portion of the motor. By driving current through coils of the motor, a net torque around pivot bearings of pivot points of the linkage may be achieved. This torque can result in a rotation of the pivot levers which are coupled to the head through the linkage. As a consequence, the levers pivot and the head is translated as a function of the magnitude and direction of the currents through the coils. The four member linkage of the head actuator may be arranged to allow for primarily vertical actuation with minimal lateral translation. It is appreciated that the degree of vertical and lateral translation may vary, depending upon the particular application. Other embodiments are described and claimed.

BRIEF DESCRIPTION OF THE DRAWINGS

Referring now to the drawings in which like reference numbers represent corresponding parts throughout.

DETAILED DESCRIPTION

In the following description of the exemplary embodiment, reference is made to the accompanying drawings which form a part hereof, and in which is shown by way of illustration a specific embodiment which may be practiced. It is to be understood that other embodiments may be utilized as structural changes may be made without departing from the scope of the present description.

In one embodiment, a balanced linkage actuator is provided for a tape head. It is believed that an actuator in accordance with the present description can perform well in a shock and vibration environment. In one aspect, the mass of the tape head and linkage may be balanced by the mass of one or more movable coils. In addition, a spring or other flexure may be eliminated. It is appreciated that other features may be realized, depending upon the particular application.

Figure 1:
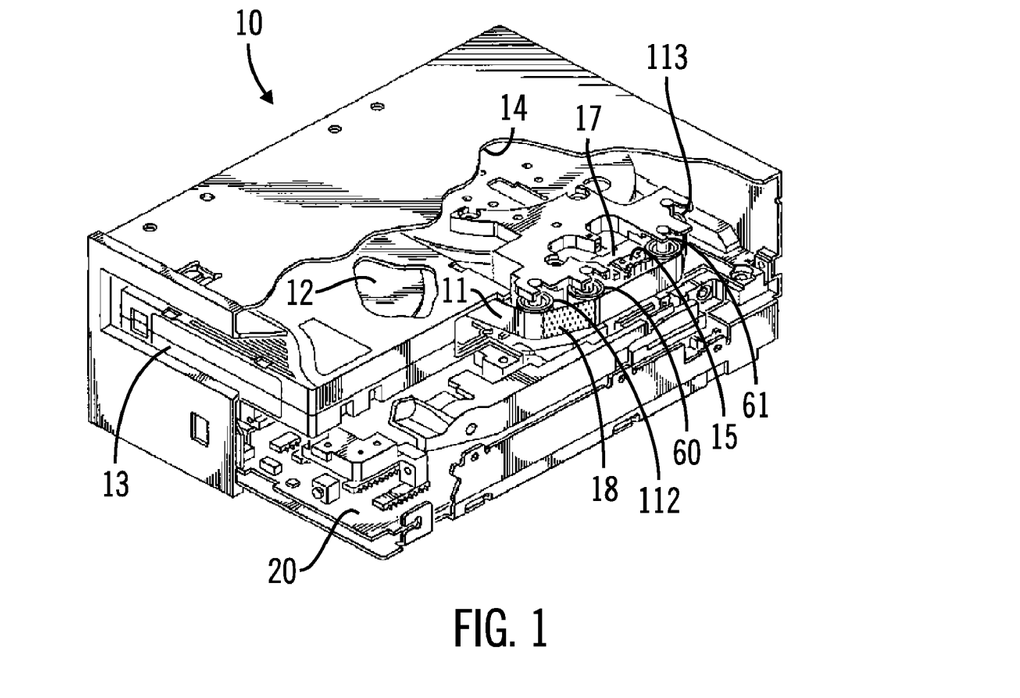
FIG. 1 illustrates one embodiment of a tape drive implementing a servo system in accordance with the present description.

FIG. 1 illustrates a tape drive 10, such as a magnetic tape drive, utilizing a tape head actuator in accordance with one embodiment of the present description. A magnetic tape 11 is moved along a tape path from a supply reel 12 in a magnetic cartridge 13 to a take up reel 14, the reels comprising drive reels of a drive system operated by drive motors. The magnetic tape is moved along the tape path in a longitudinal direction across a tape head 15. The tape head is supported by an actuator 17 of a servo system, which, for example, may comprise a compound actuator. The tape head 15, for example, a magnetic tape head, may comprise a plurality of read and write elements and a plurality of servo read elements. The tape may comprise a plurality of servo tracks or bands 18 which are recorded on the tape in the longitudinal direction on the tape which are parallel to the data tracks. The servo read elements are part of a track following servo system for moving the tape head 15 in a lateral direction for following lateral movement of the longitudinal tracks as the tape 11 is moved in the longitudinal direction, and thereby position the tape head at the data tracks to follow the data tracks.

The compound actuator may comprise a coarse actuator, having a stepper motor, for example, and a fine actuator, having a voice coil motor, for example, mounted on the coarse actuator. In the illustrated embodiment, the fine actuator has a high bandwidth for a limited lateral movement, called "fine" track following, allowing the tape head to accurately follow small displacements of the tape. Larger movement of the tape head may be conducted by the coarse actuator which can center the actuator at the average position of the fine actuator during track following. The coarse actuator may also be employed to shift the tape head from one set of tracks to another set. The shifting may be conducted at a slow rate in the illustrated embodiment. It is appreciated that a tape head actuator in accordance with the present description may be used as a coarse actuator, fine actuator, or both, depending upon the particular application.

The tape drive 10 additionally comprises a controller 20 which provides the electronics modules and processor to implement the servo system to operate the compound actuator. The magnetic tape 11 of the present example may be provided in a tape cartridge or cassette 13 having a supply reel 12 or having both the supply and take up reels.

The data tracks of this embodiment may be narrow and closely spaced. Also, in this embodiment, the tape 11 can be very thin with little lateral stiffness at the edge. Tape guides 60, 61, 112, 113 may be provided which reduce excessive lateral movement of the tape, for example, from runout of the supply reel 112 or the take up reel 114, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape. It is appreciated that the heads, reels, tape, tracks, drives and tape guides may vary, depending upon the particular application.

In the illustrated embodiment, the fine actuator track following typically comprises a high bandwidth for a relatively limited lateral movement and therefore limited transient response for allowing the tape head to accurately follow small displacements of the tape. The coarse actuator of the illustrated embodiment, provides larger movement of the tape head for track following, which is also employed to shift the tape head from one set of tracks to another set, and is conducted at a slow rate. It is appreciated that the actuator type may vary, depending upon the particular application.

Figure 2:
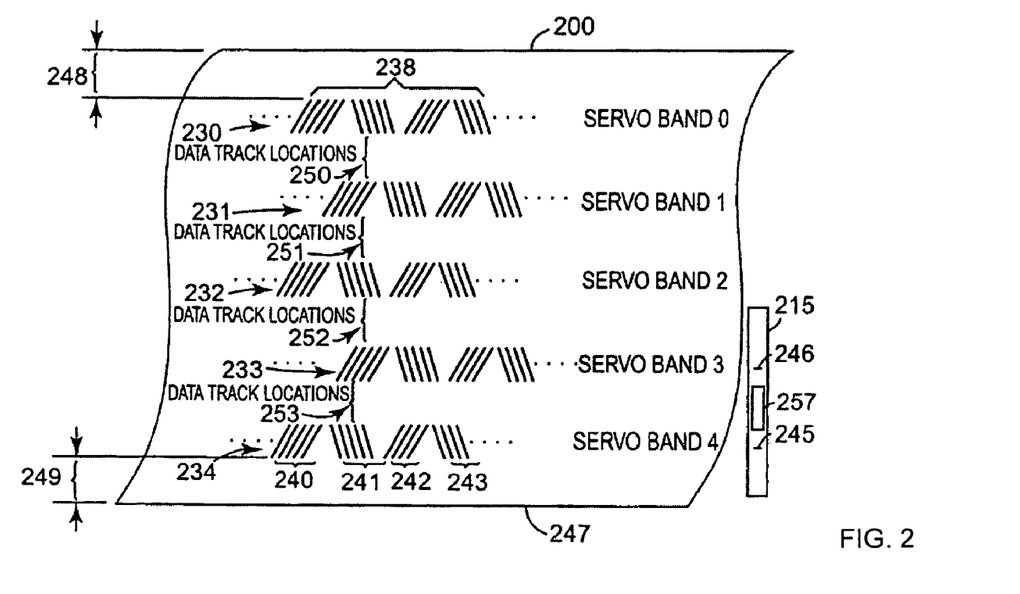
FIG. 2 illustrates one example of a section of a magnetic tape for use in a tape drive according to the present description.

FIG. 2 illustrates one example of a section of a magnetic tape 200 for use in a servo system according to the present description. The servo tracks or bands 230-234 may comprise any of several types of longitudinal servo patterns as is known to those of skill in the art. In the example of FIG. 2, a timing base servo pattern is illustrated, which is described in coassigned U.S. Pat. No. 5,689,384, and which comprises magnetic transitions recorded at more than one azimuthal orientation across the width of the servo track. In the specific example of FIG. 2, five longitudinal timing base servo tracks 230-234 are prerecorded on the magnetic tape 200 for track following at these positions. The pattern of magnetic transitions recorded in the servo tracks is a repeated set of frames 238, each of which are of different azimuthal orientations. In the example of FIG. 2, the tape head 215 comprises at least two narrow servo read elements 245, 246, allowing two servo tracks to be sensed simultaneously, and the outputs used redundantly to reduce error rates.

In the example of FIG. 2, lateral position sensing within a servo track is achieved by deriving a ratio of two servo pattern intervals and is relatively insensitive to tape speed. Specifically, the lateral position may be the ratio of (1) the distance between transitions of bursts 240 and 241, called the "A" distance, to (2) the distance between transitions of bursts 240 and 242, called the "B" distance. Thus, as the tape head servo read elements 245, 246 move toward the edge 247 of the tape 200, the ratio of the distance between the transitions of bursts 240 and 241 to the distance between the transitions of bursts 240 and 242 becomes greater, since the distance between the "A" transitions of bursts 240 and 241 is greater, while the distance between the "B" transitions of bursts 240 and 242 remains unchanged. What is actually measured are time TA and TB between the transitions defining the "A" and "B" distances which vary with tape speed. Since the "B" distance is unchanged at various lateral positions, the ratio TA/TB is the same as "A"/"B" and is insensitive to tape speed. Still referring to FIG. 2, the magnetic tape 200 may be provided with guard bands 248, 249 at the edges of the tape, and four data track regions 250-253 are provided between the servo tracks. A plurality of read and write elements 257 are provided at the tape head 215 for reading and/or writing data on the tape 200. When the servo elements 245, 246 are properly positioned at the specific servo tracks 230-234, the read and write elements 257 are properly positioned to transfer data with respect to the corresponding data track locations of the tape 200.

Figure 3:
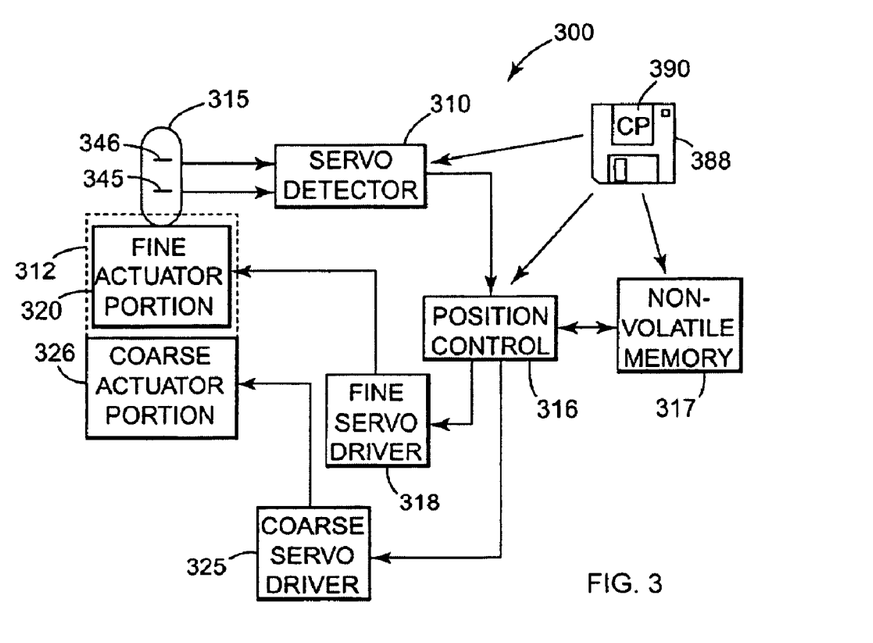
FIG. 3 illustrates an embodiment of a servo system having a fine actuator in accordance with the present description.

FIG. 3 illustrates one example of a servo system 300 according to the present description. In FIG. 3, a servo track sensor includes a servo detector 310 coupled to the servo elements 345, 346 of the tape head 315. A head position controller for controlling the head position actuator includes a position control 316 which may comprise a microprocessor or other controller with an attached nonvolatile memory 317 for storing information and programming for the position control. The position control 316 provides, for example, digital servo output data for operating the compound actuator 312. Those of skill in the art will understand that various devices are available to provide the needed signals for the servo detector and position control functions. A fine servo driver 318 converts track following servo output data to the appropriate drive signals for operating a fine actuator portion 320, and a coarse actuator driver 325 converts the coarse servo output data to, for example, appropriate step drive signals for operating a coarse actuator portion 326, of the compound actuator 312. The servo track detector 310 and drivers 318 and 325 may also comprise electronic modules of the system 300.

Figure 4:
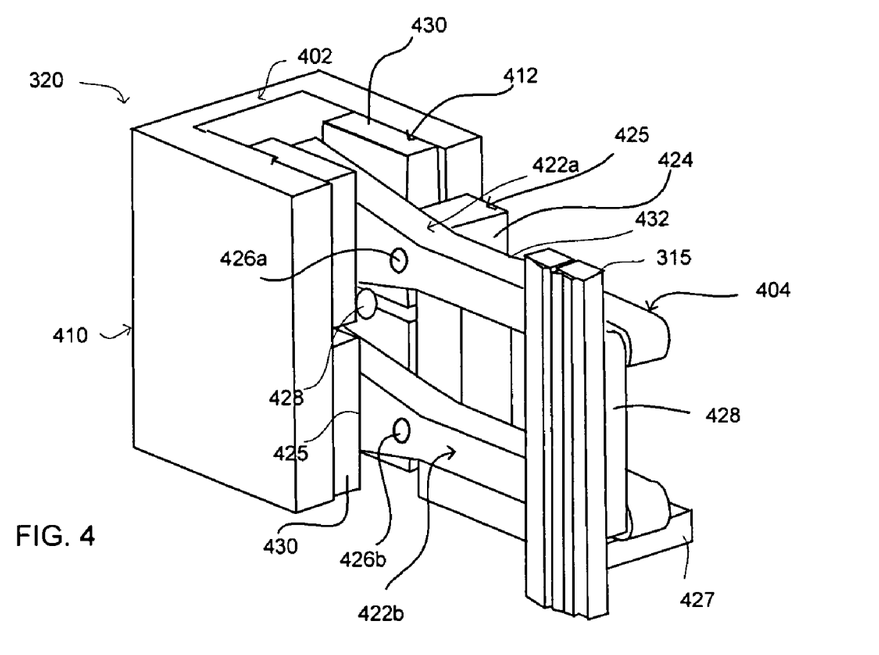
FIG. 4 is a front, isometric schematic view of one embodiment of a fine actuator in accordance with the present description.
Figure 5:
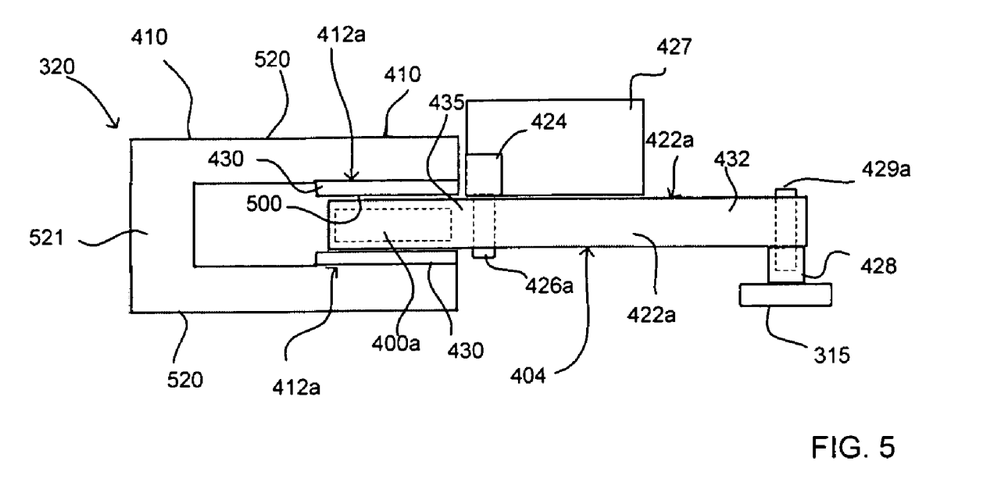
FIG. 5 is a top plan schematic view of the fine actuator of FIG. 4.
Figure 6:
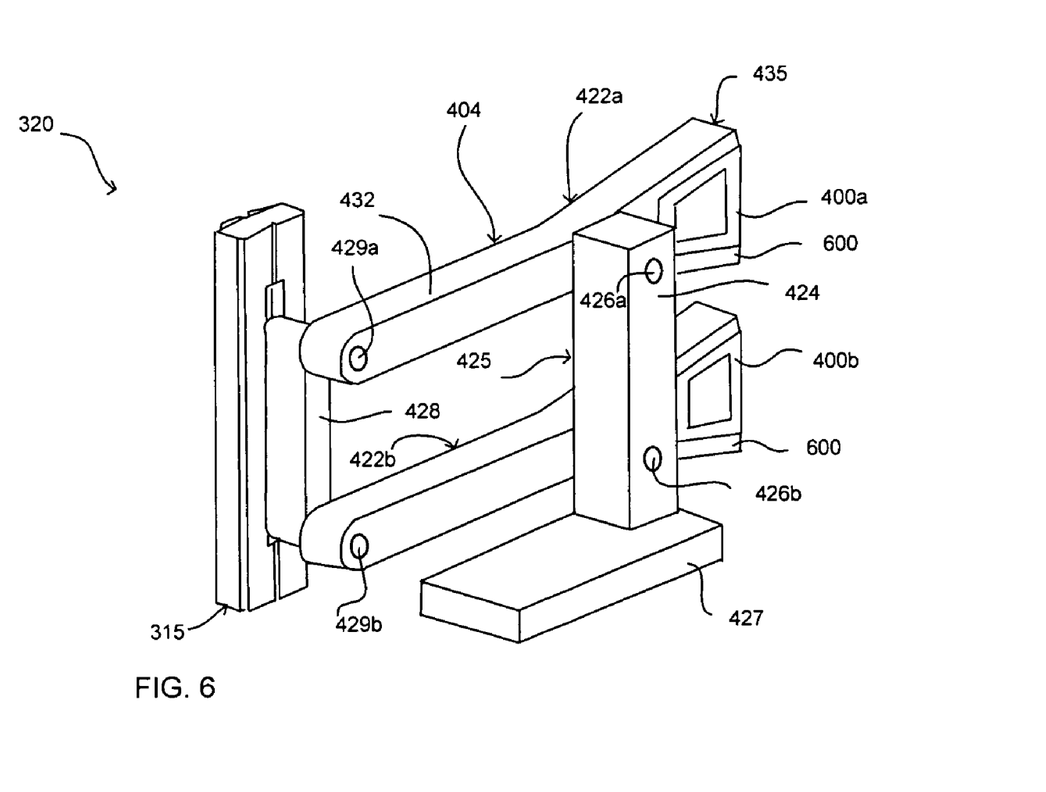
FIG. 6 is a rear, isometric schematic view the fine actuator of FIG. 4 shown without the magnetic return structure.

FIGS. 4-6 illustrate one embodiment of a fine actuator 320 for a tape read/write head 315. The actuator 320 includes first and second movable coils 400a, 400b (FIG. 6), each of which is adapted to conduct an electric current provided by the fine servo driver 318. The movable coils 400a, 400b are part of a motor 402 which when activated, actuates a 4-member linkage 404 which carries the tape head 315.

The motor 402 includes a return path structure 410 having a magnet assembly 412 positioned adjacent the coils 400a, 400b. The structure 410 is formed of a magnetically permeable material, to conduct the magnetic field generated by the magnet assembly 412.

The linkage 404 includes a first lever 422a and a member 424 of a support frame 425. The lever 422a is pivotally coupled to the member 424 at a pivot point 426a. A second lever 422b of the linkage 404 is pivotally coupled to the member 424 of the support frame 425 at a second pivot point 426b. The support frame 425 includes a base 427. A link member 428 of the linkage 404 is pivotally coupled to the levers 422a, 422b at pivot points 429a, 429b (FIG. 6), respectively. In this manner, the linkage 404 comprises the four members 422a, 422b, 424 and 428 pivotally coupled in a parallelogram shape. The tape head 315 is supported by the link member 428 on a first side 432 of the levers 422a, 422b relative to the pivot points 426a, 426b. It is appreciated that other shapes may be realized for the linkage 404, depending upon the particular application.

Figure 7A:
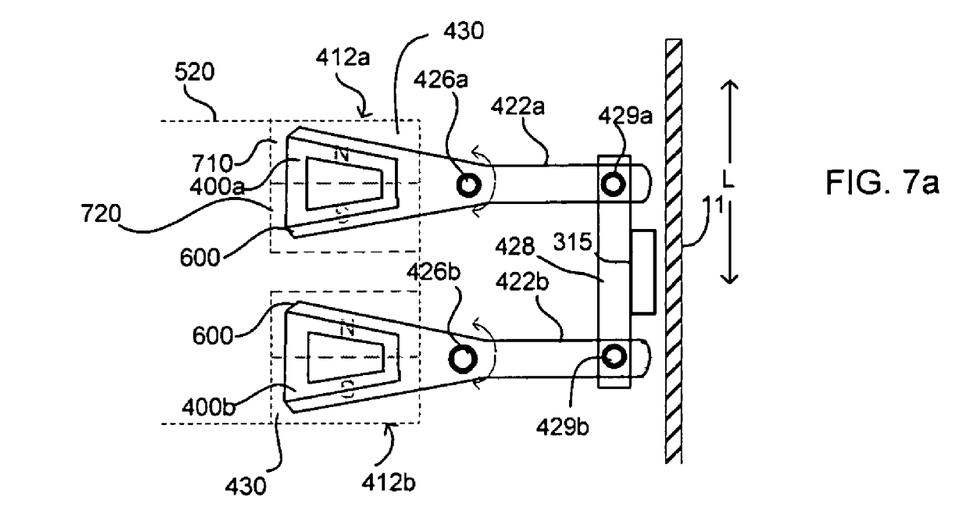
FIGS. 7a, 7b are schematic diagrams illustrating a first centered position and a second pivoted position, respectively of one embodiment of a fine actuator in accordance with the present description.
Figure 7B:
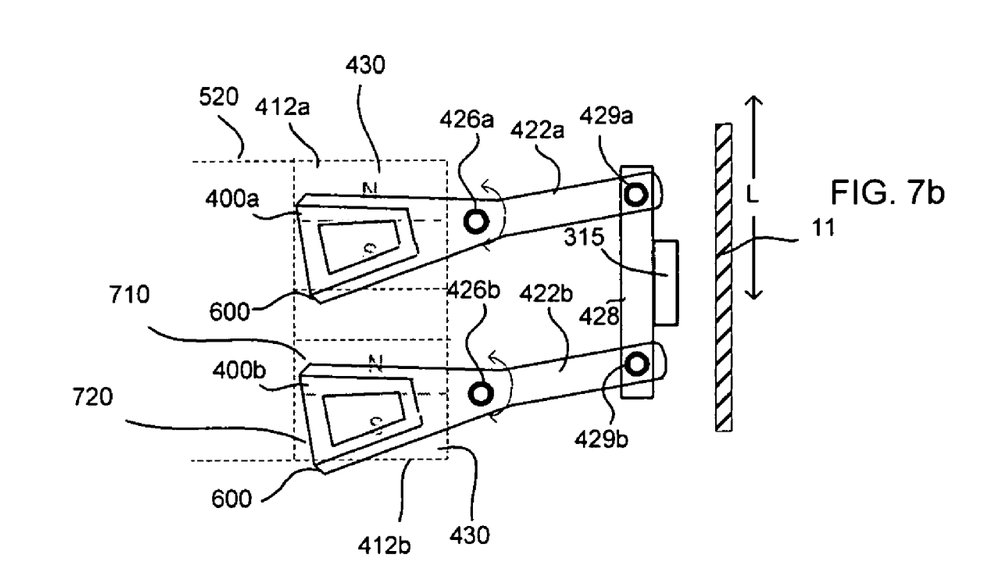
Figure 8A:
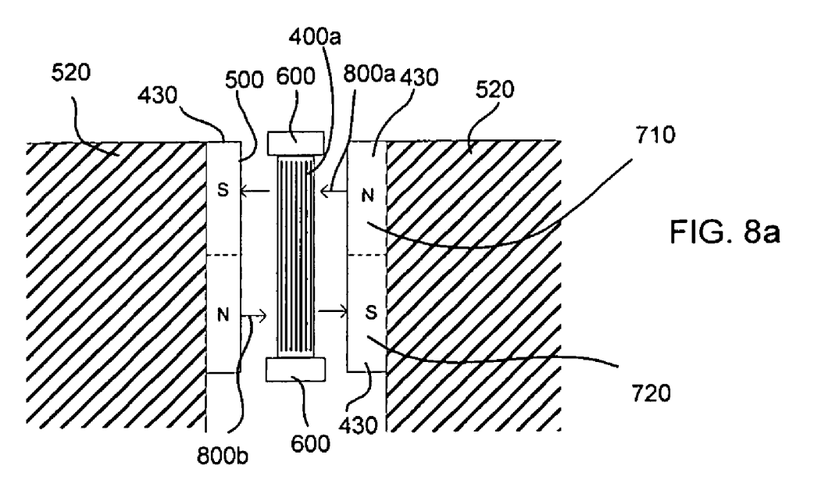
FIGS. 8a, 8b are schematic cross-sectional diagrams illustrating a first centered position and a second pivoted position, respectively of one embodiment of a fine actuator in accordance with the present description.
Figure 8B:
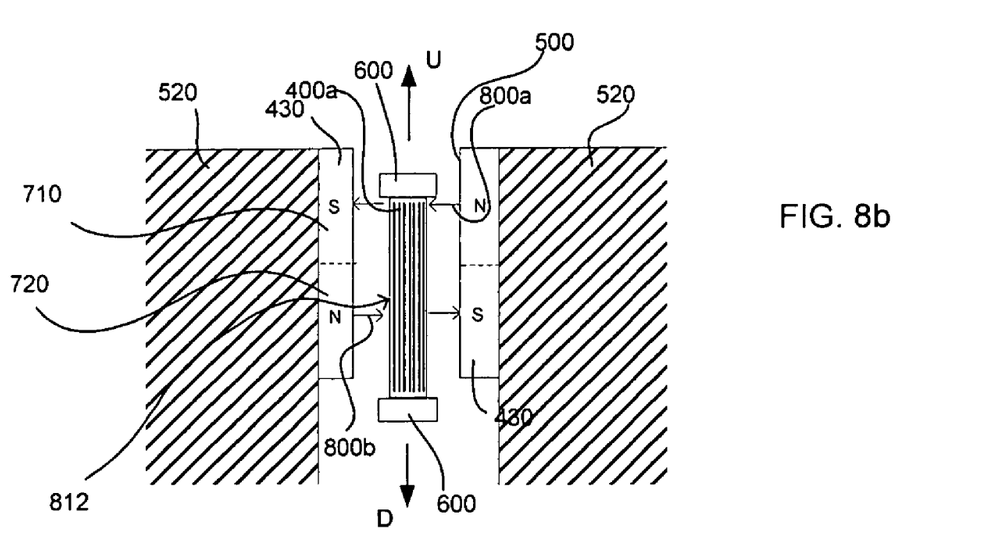

The movable coils 400a, 400b are supported by the levers 422a, 422b, respectively on a second side 435 (FIG. 5) of the levers 422a, 422b relative to the pivot points 426a, 426b and opposite that of the first side 432. In the illustrated embodiment, as shown in FIGS. 4-7a, 8a, the coils 400a, 400b are positioned facing the magnet assembly 412 of the return path structure 410 so that magnetic attraction/repulsion between the energized coils 400a, 400b and the magnets of the magnet assembly 412 causes the levers 422a, 422b to pivot up and down as a function of the magnitude and direction of the currents flowing through the coils 400a, 400b, as illustrated in FIGS. 7b, 8b. In this manner, the tape head 315 may be actuated up and down through the linkage 404.

In accordance with one aspect of the present description, the levers 422a, 422b are balanced at the pivot points 426a, 426b, respectively by a first mass carried by one side 432 of the levers 422a, 422b, and by a second mass carried by the other side 435 of the levers 422a, 422b. In the illustrated embodiment, the first mass includes the link member 428 and the read/write head 315, and the second mass includes the coils 400a, 400b of the motor 402. As a consequence, in one feature of the present description, the tape head 315 can be relatively resistant to the effects of shock or vibration which may occur in use.

In another feature of the present description, use of flextures to center the levers 422a, 422b and tape head 315 relative to the tape 11 can be reduced or eliminated, which can reduce or eliminate any fundamental spring mass resonance of the actuator 320. As a consequence, the use of damping fluid or the like can also be reduced or eliminated. It is appreciated that other features may be realized, depending upon the particular application.

As best seen in FIGS. 6-8b, the second side 435 of each lever 422a, 422b, includes a coil holder 600 adapted to hold the associated coil 422a, 422b. In the illustrated embodiment, each coil 422a, 422b has a plurality of planar turns supported by the coil holder 600 formed at the end of the second side 435 of the lever 422.

The return path structure 410 is positioned adjacent the magnet assembly 412 to conduct the magnetic fields generated by the magnets of the magnet assembly 412. The magnetic return path structure 410 is, in the illustrated embodiment, fixed, that is nonmoving, and may be supported by the first support frame 425 or other suitable support structure. As best seen in FIG. 5, the return path structure 410 includes a pair of parallel return pole pieces or members 520, which support the magnet assembly 412 at one end. The pole members 520 are joined by an end member 521 at the other end. The return path structure 410 is made of a ferromagnetic material such as nickel, iron, steel or suitable magnetically permeable materials.

The magnet assembly 412 includes an upper assembly portion 412a (FIGS. 7a, 7b) and a lower assembly portion 412b, each of which defines a gap 500 (FIG. 5) in which an associated coil 422a, 422b is positioned. The magnetic fields produced by the magnets of the magnet assembly 412 are represented by the field lines 800a, 800b in FIG. 8a. as shown, for example, for the upper magnet assembly portion 412a. The magnetic fields 800a, 800b are conducted by the member 520 of the return path structure 410 to span the gap 500 in the upper magnet assembly portion 412a.

In the illustrated embodiment, the magnetic polarities of the magnets of each assembly portion 412a, 412b, of the magnet assembly 412, are arranged to alternate as shown in FIGS. 7a-8b. More specifically, the face of a magnet 430 is magnetically polarized oppositely by halves 710, 720 as shown. In addition, the location of each polarity half 710, 720 is not centered in the flux from the associated coil 400a, 400b positioned in the gaps 500 of the return path structure 410.

In addition, current conducted through the coil 400a (FIG. 8b) interacts with the magnetic fields 800a, 800b of the magnet assembly portion 412a. The radial sections of the coil 400a interact with the magnetic fields 800a, 800b to produce a motion when current is applied to the coil 400a. Those sections of the coil 400a which are perpendicular to the direction of motion are effective to produce motion. Thus, as a result of the interaction (Lorentz forces) between the electric currents of the coil 400a and the magnetic fields of the magnets of the upper magnet assembly portion 412a, the levers 422a, 422b of the linkage 404 pivot to move the tape head 315 (FIGS. 7b, 8b) relative to the support frame 425 and the tape 11 as a function of the magnitude and direction of the current through the coil 400a.

In a similar manner, current conducted through the coil 400b interacts with the magnetic fields of the lower magnet assembly portion 412b. As a result, the levers 422a, 422b of the linkage 404 pivot to move the tape head 315 (FIGS. 7b, 8b) relative to the support frame 425 and the tape 11 as a function of the magnitude and direction of the current through the coil 400b as well.

Although one magnet 430 is shown on each side of the gap 500 in the illustrated embodiment, it is appreciated that multiple magnets may be utilized on each side to actuate the tape head, depending upon the particular application. Thus, for example, the face of the magnet 430 may be subdivided into portions of opposite magnetic polarity, or may be two or more separate magnets arranged in a suitable configuration. In the illustrated embodiment, the face of the magnet 430 is magnetically polarized oppositely by halves 710, 720 as noted above. It is appreciated that the magnetic polarizations may be achieved using a variety of techniques including fabricating one or more separate permanent magnets into an assembly of different polarizations. Each magnet assembly may have a face with different polarizations wherein each polarization is provided by a separate magnet or a portion of a magnet. Also, the relative proportions of the different polarizations may vary, depending upon the particular application.

In the illustrated embodiment, the coil holder 600 of each lever 422a, 422b is rigidly attached to the associated coil 400a, 400b, so that motion of the coil 400a, 400b, is directly transmitted to each coil holder 600, the linkage 404, and the tape head 315. The motion of the coil holders 600 and the levers 422a. 422b is constrained by the pivots at the pivot points 426a, 426b. However, in the illustrated embodiment, the levers 422a, 422b move or pivot free of flexural tension and thus are not constrained by flextures or other springs or by damping mechanisms. It is appreciated that in some embodiments, flexures and/or damping mechanisms may be added, depending upon the particular application.

Still further, it is believed that the dynamics of the actuator system can be readily modified or optimized by adjusting the moving masses and the materials used in the design. Still further, the dimensions of the magnetic gaps 500 in which the coils move can be optimized to improve the dynamics of the actuator operation. It is appreciated that the particular features, such as materials choice and geometric configuration, and aspects may vary, depending upon the particular application.

Figure 9:
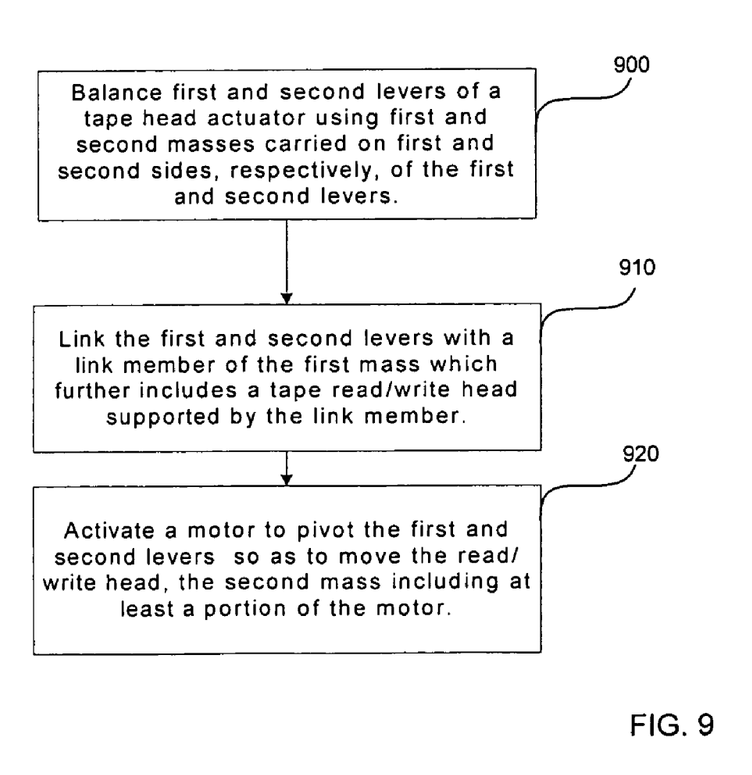
FIG. 9 is a flow chart depicting one embodiment of operations of a fine actuator in accordance with the present description.

FIG. 9 is a flowchart depicting one example of operations to control the position of a read/write head. In one operation, first and second levers are balanced (block 900) of a tape head actuator using first and second masses carried on first and second sides, respectively, of the first and second levers. In another operation, the first and second levers are linked (block 910) with a link member of the first mass which further includes a tape read/write head supported by the link member. In the illustrated embodiment, the levers 422a, 422b are linked by the pivotally connected link members 424, 428 to form the four member linkage 404. The tape read/write head 315 is carried by the link member 424.

In yet another operation, a motor may be activated (block 920) to pivot the first and second levers so as to move the read/write head wherein the second mass includes at least a portion of the motor. Thus, for example, by driving current through the coils 400a, 400b, a net torque around pivot bearings of the pivot points 426a, 426b may be achieved. This torque can result in a rotation of the pivot levers 422a, 422b which are coupled to the head 315 through the linkage 404. As a consequence, the levers pivot and the head is translated as a function of the magnitude and direction of the currents through the coils.

In one aspect, the four member linkage 404 of the head actuator 320 is arranged to allow for primarily vertical actuation with minimal lateral translation. It is appreciated that the degree of vertical and lateral translation may vary, depending upon the particular application.

To facilitate the dynamic response and resistance to shock and vibration, the mass of the read/write head and link member on one side of the levers may be balanced by the mass of the motor coils on the other side of the levers as described above. It is appreciated that the masses used to balance the levers may include motor portions other than coils such as magnets or return path structures. Furthermore, either or both of the first and second masses used to balance the levers may include motor portions.

By operating the coils 400a, 400b in synchronous fashion, a linear motion can be achieved. It is appreciated that the number of coils may be fewer or greater than two, depending upon the particular application. Thus, for example, a counterweight may be utilized in place of one of the coils to maintain balance, if only one coil was used.

A head actuator in accordance with the present description may be used for actuation in the coarse motion and/or the fine motion functions that are typically found in tape drive actuators. If the motion is used for fine track following, the intended actuation direction can be on the order of microns since the lateral shift, or change in distance between the air bearing surface and typical roller bearings, as the pivotable arms rotate, can be relatively small. If the actuation is used for coarse motion, such as to change bands for example, the lateral shift can be a larger but still suitable with respect to the typical distances found between the air bearing surfaces and roller bearings. Thus, an actuator in accordance with the present description may be integrated into a coarse motion linear actuator system to perform the coarse motion functions typically used in tape drives to reach different data bands, such as those functions performed by a stepper motor or linear VCM system.

In another aspect, a compactness may be achieved by offsetting the motor 402 with respect to the head 315. Thus, a balanced motion can facilitate both high bandwidth track following, and incorporating the actuator in compact tape drive designs. It is appreciated that the particular features realized may vary, depending upon the particular application.

The process illustrated with reference to FIG. 9 may be tangibly embodied in a computer-readable medium or carrier, e.g. one or more of the fixed and/or removable data storage devices 388 illustrated in FIG. 3, or other data storage devices. The computer program 390 may be loaded into the memory 317 or the position controller 316 of FIG. 1, for execution. The computer program 390 comprise instructions which, when read and executed by the position controller 316 of FIG. 1, causes the tape system 300 to perform operations in accordance with the present description.

Thus, the described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the article of manufacture implementing the code may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made to this configuration without departing from the scope of the present invention, and that the article of manufacture may comprise suitable information bearing medium known in the art.

The foregoing description of exemplary embodiments has been presented for the purposes of illustration and explanation. It is not intended to be exhaustive or to limit the description to the precise form disclosed. Many modifications and variations are possible in light of the above teaching.

What is claimed is:

1. A read/write device for a tape drive system for a tape, comprising:
    a base having a first support frame;
    a first lever pivotally coupled to said first support frame at a first pivot point, said first lever having a first side on one side of said first pivot point and a second side on the other side of said first pivot point;
    a second lever pivotally coupled to said first support frame at a second pivot point, said second lever having a first side on one side of said second pivot point and a second side on the other side of said second pivot point;
    a first mass carried by the first side of each of said first and second levers, said first mass including a link member pivotally coupled to said first lever at a third pivot point on said first side of said first lever, said link member being pivotally coupled to said second lever at a fourth pivot point on said first side of said second lever, said first mass further including a tape read/write head supported by said link member;
    a motor adapted to pivot said first and second levers about said first and second pivot points, respectively, so as to move said read/write head; and
    a second mass carried by the second side of each of said first and second levers, said second mass including at least a portion of said motor wherein said first and second levers are balanced on said first and second pivots, respectively, by said first and second masses.

2. The device of claim 1 where said motor comprises:
    a first permanent magnet;
    a first return path structure formed of a magnetically permeable material, and positioned adjacent said first magnet to conduct the magnetic field of the magnet; and
    a first coil adapted to conduct an electric current, said coil being positioned facing said return path structure so that current conducted through said coil interacts with the magnetic field of said magnet which causes said linked first and second levers to pivot and said tape read/write head to move relative to said first support frame as a function of the magnitude and direction of said current through said coil.

3. The device of claim 2 wherein said portion of said motor included in said second mass includes said first coil.

4. The device of claim 3 wherein said first lever includes a first coil holder adapted to hold said first coil.

5. The device of claim 3 wherein said motor includes a second magnet positioned adjacent the first return path structure so that the first return path structure conducts the magnetic field of the second magnet, and wherein the second magnet defines a gap between said first and second magnets, and said first coil being positioned in said gap.

6. The device of claim 2 where said motor further comprises:
    a second permanent magnet positioned adjacent the return path structure which conducts the magnetic field of the second magnet; and
    a second coil adapted to conduct an electric current, said second coil being positioned facing said second magnet so that current conducted through said second coil interacts with the magnetic field of said second magnet which causes said linked levers to pivot and said tape read/write head to move relative to said first support frame as a function of the magnitude and direction of said current through said second coil.

7. The device of claim 6 wherein said portion of said motor included in said second mass includes said second coil.

8. The device of claim 7 wherein said second lever includes a second coil holder adapted to hold said second coil.

9. The device of claim 7 wherein said motor includes a third magnet positioned adjacent the return path structure wherein the third magnet defines a gap between said second and third magnets, and said second coil being positioned in said gap.

10. The device of claim 2 wherein said tape drive system is adapted to move said tape along said tape path in a longitudinal direction across said tape head, said tape having tracks extending in said longitudinal direction, said tape being subject to transient movement in a lateral direction with respect to said longitudinal direction, said device further comprising:
a tape track sensor positioned to detect tracks of the tape; and
a controller responsive to the tape track sensor and adapted to control the current through said coil to pivot said levers and translate said tape read/write head relative to said first support frame to control the position of the tape head relative to the tape tracks as a function of the magnitude and direction of said current through said coil.

11. The device of claim 2 wherein said magnet has a face disposed adjacent said first coil, said face being divided into portions of opposite magnetic polarity.

12. The device of claim 2 further comprising a magnet assembly having a plurality of magnets and a face disposed adjacent said first coil, said face being divided into portions of opposite magnetic polarity wherein said magnet assembly includes said first permanent magnet.

13. A method of reading and writing data on a tape, comprising:
balancing first and second levers of a tape head actuator using first and second masses carried on first and second sides, respectively, of said first and second levers, said first and second levers being pivotally coupled to a first support frame at first and second pivot points, respectively;
linking said first and second levers with a link member of said first mass at third and fourth pivot points, respectively, on said first side, said first mass further including a tape read/write head supported by said link member; and
activating a motor of said actuator to pivot said first and second levers about said first and second pivot points, respectively, so as to move said read/write head, said second mass including at least a portion of said motor.

14. The method of claim 13 where said motor activating includes conducting electric current through a first coil, said coil being positioned facing a magnet of a return path structure so that current conducted through said coil interacts with the magnetic field of the magnet which causes said linked first and second levers to pivot and said tape read/write head to move relative to said first support frame as a function of the magnitude and direction of said current through said coil.

15. The method of claim 14 wherein said portion of said motor included in said second mass includes said first coil.

16. The method of claim 15 wherein said first lever includes a first coil holder adapted to hold said first coil.

17. The method of claim 15 wherein said motor includes a second magnet positioned adjacent the first return path structure so that the first return path structure conducts the magnetic field of the second magnet, and wherein the second magnet defines a gap between said first and second magnets, and said first coil being positioned in said gap.

18. The method of claim 14 where said motor further comprises:
a second permanent magnet positioned adjacent the return path structure which conducts the magnetic field of the second magnet; and
a second coil adapted to conduct an electric current, said second coil being positioned facing said second magnet so that current conducted through said second coil interacts with the magnetic field of said second magnet which causes said second lever to pivot and said tape read/write head to move relative to said first support frame as a function of the magnitude and direction of said current through said second coil.

19. The method of claim 18 wherein said portion of said motor included in said second mass includes said second coil.

20. The method of claim 19 wherein said second lever includes a second coil holder adapted to hold said second coil.

21. The method of claim 19 wherein said motor includes a third magnet positioned adjacent the return path structure so that the return path structure conducts the magnetic field of the third magnet, and wherein the third magnet defines a gap between said second and third magnets, and said second coil being positioned in said gap.

22. The method of claim 14 further comprising:
moving said tape along a tape path in a longitudinal direction across said tape head, said tape having tracks extending in said longitudinal direction, said tape being subject to transient movement in a lateral direction with respect to said longitudinal direction,
detecting tracks of the tape using a tape track sensor; and
in response to the tape track sensor, controlling the current through said coil to pivot said levers and move said tape read/write head relative to said first support frame to control the position of the tape head relative to the tape tracks as a function of the magnitude and direction of said current through said coil.

23. The method of claim 14 wherein said magnet has a face disposed adjacent said first coil, said face being divided into portions of opposite magnetic polarity.

24. The method of claim 14 wherein said magnet is a part of a magnet assembly having a plurality of magnets and a face disposed adjacent said first coil, said face being divided into portions of opposite magnetic polarity.

* * * * *